United States Patent [19]
Stent et al.

[11] Patent Number: 5,355,327
[45] Date of Patent: Oct. 11, 1994

[54] AUTOMATED STATISTICAL DATA COLLECTION SYSTEM

[75] Inventors: Robert J. Stent, Westford; Michael McGreevey, Billerica, both of Mass.

[73] Assignee: Davox Corporation, Westford, Mass.

[21] Appl. No.: 798,241

[22] Filed: Nov. 26, 1991

[51] Int. Cl.5 .............................................. G06F 15/21
[52] U.S. Cl. .............................. 364/551.01; 364/550; 364/401; 364/DIG. 1
[58] Field of Search ............. 377/15, 16; 364/DIG. 1, 364/280, 281.3, 264, 238.2, 550, 551.01, 401

[56] References Cited
U.S. PATENT DOCUMENTS

| | | | |
|---|---|---|---|
| 3,648,243 | 3/1972 | Wiggins | 377/16 |
| 3,878,371 | 4/1975 | Burke | 377/16 |
| 4,893,248 | 1/1990 | Pitts et al. | 364/550 |
| 5,027,297 | 6/1991 | Garitty et al. | 364/550 |
| 5,101,425 | 3/1992 | Darland et al. | 379/34 |
| 5,182,705 | 1/1993 | Barr et al. | 364/401 |

Primary Examiner—Jack B. Harvey
Assistant Examiner—Jae H. Choi
Attorney, Agent, or Firm—Daniel J. Bourque; Michael J. Bujold; Anthony G. M. Davis

[57] ABSTRACT

A statistical data collector gathers statistical data concerning the operation of at least one data terminal coupled to a host system by way of a data terminal controller. The data terminal controller controls access to the host by the data terminal. Each data terminal coupled to the data terminal controller includes at least one user definable function selector for selecting a previously defined data processing function. The data terminal controller further includes a statistical data collector, responsive to a selected data terminal user definable function selector, for gathering statistical data concerning the data processing function selected by the user definable function selector and operation of the data terminal.

15 Claims, 3 Drawing Sheets

OPERATOR PRODUCTIVITY HOURLY REPORT

COMPANY NAME: INBOUND PHONE
DEPARTMENT:
REPORT DATE: 02/20/91
REPORT TIME: 18:55:00

OPERATOR: BOB  OPID: 102
SIGNED IN DURATION (HH:MM:SS): 08:05:00

PAGE 3

| TIME SLOT | TOTAL ACCTS WORKED | TYPE-OF-ACCOUNT L/S | DISP | I/R | O | WORK TIME | IDLE TIME | ALLOCATION OF TIME (HOUR:MIN) TALK+WRAP | TALK | WRAP | AVERAGE DURATION (MIN:SEC) TALK+WRAP | IDLE TIME | TALK | WRAP |
|---|---|---|---|---|---|---|---|---|---|---|---|---|---|---|
| 9:00 | 25 | 3 | 2 | 16 | 4 | 00:58 | 00:03 | 00:55 | 00:46 | 00:09 | 02:12 | 00:07 | 01:50 | 00:22 |
| 10:00 | 21 | 2 | 3 | 14 | 2 | 00:45 | 00:03 | 00:41 | 00:37 | 00:04 | 01:57 | 00:09 | 01:45 | 00:12 |
| 11:00 | 31 | 3 | 4 | 23 | 1 | 01:00 | 00:02 | 00:58 | 00:49 | 00:09 | 01:52 | 00:02 | 01:34 | 00:18 |
| 12:00 | 12 | 0 | 1 | 9 | 2 | 00:28 | 00:02 | 00:26 | 00:25 | 00:01 | 02:10 | 00:10 | 02:05 | 00:05 |
| 13:00 | 23 | 2 | 3 | 17 | 1 | 01:00 | 00:03 | 00:57 | 00:50 | 00:07 | 02:28 | 00:08 | 02:10 | 00:18 |
| 14:00 | 26 | 4 | 3 | 17 | 2 | 01:00 | 00:01 | 00:59 | 00:48 | 00:11 | 02:16 | 00:02 | 01:50 | 00:26 |
| 15:00 | 20 | 1 | 2 | 15 | 2 | 00:47 | 00:02 | 00:45 | 00:39 | 00:06 | 02:15 | 00:06 | 01:57 | 00:18 |
| 16:00 | 33 | 3 | 2 | 23 | 5 | 01:00 | 00:03 | 00:57 | 00:51 | 00:06 | 01:44 | 00:06 | 01:33 | 00:11 |
| 17:00 | 29 | 4 | 5 | 17 | 3 | 01:00 | 00:05 | 00:55 | 00:46 | 00:09 | 01:53 | 00:10 | 01:35 | 00:18 |
| 18:00 | 3 | 0 | 0 | 2 | 1 | 00:07 | 00:01 | 00:06 | 00:05 | 00:01 | 02:00 | 00:19 | 01:40 | 00:20 |

OPERATOR TOTALS

| TOTAL ACCTS WORKED | TYPE-OF-ACCOUNT L/S | DISP | I/R | O | ALLOCATION OF TIME (HOUR:MIN) AVAILABLE | IDLE TIME | TALK+WRAP | TALK | WRAP | AVERAGE DURATION (MIN:SEC) TALK+WRAP | IDLE TIME | TALK | WRAP |
|---|---|---|---|---|---|---|---|---|---|---|---|---|---|
| 223 | 22 | 25 | 153 | 23 | 08:05 | 00:26 | 07:39 | 06:36 | 01:03 | 02:04 | 00:07 | 01:47 | 00:17 |

FIG. 3

AUTOMATED STATISTICAL DATA COLLECTION SYSTEM

FIELD OF THE INVENTION

This invention relates to computer systems and more particularly, to an automated statistical data collection system which monitors and records computer system terminal generated events.

BACKGROUND OF THE INVENTION

Managers or administrators of computer systems such as data processing or communication systems which employ a number of data terminal operators generally desire to monitor how efficiently operators use their time, and to gather other useful information on the use of computer system resources.

Prior art statistical data collection systems include manually completed tally or "tick" sheets on which an operator is required to enter and/or check-off various information such as the number of customers serviced, the type of service rendered, or other similar statistical type information. Such manual record keeping is cumbersome and inaccurate. Additionally, in order for such manually gathered information to be useful to a data processing system manager or administrator, the manually entered statistical data must be keyed as input to a program or data base capable of analyzing, arranging and reporting the data.

Prior art computerized statistical data collection systems are operative only on one host computer and accordingly, such prior art collection systems are not aware of any operator functions performed by an operator with another host or peripheral. Therefore, such prior art systems can generally only count the number of terminal key strokes, or the number of times an application program is accessed. Such prior art systems thus report only a very limited amount of statistical information by application program or by terminal node. Additionally, the prior art statistical collection systems are not aware of and cannot keep track of "local" terminal operations such as resizing the screen, etc. Finally, such systems typically require a great deal of host system interconnection, which in turn affects host performance. Host performance is also affected by the storage of large amounts of statistical data on the host system.

An additional problem arises when a plurality of data terminals are connected as "logical units" serviced by one controller or resource server employing logical unit pooling, and which in turn is coupled to one terminal node of a host computer. In such a topography, logical unit pooling by the controller or resource server prevents the host system from reporting true operator by operator statistics since many operators access the host via the one terminal mode.

SUMMARY OF THE INVENTION

Accordingly, the present invention provides a novel statistical collection system which is not dependent upon any fixed resources such as host or peripherals; which is not attached to any specific application program; and which does not collect extraneous and unnecessary data.

This invention features such a system for gathering statistical data about the operation of at least one data terminal coupled to a host computer system by means of a data terminal controller. The system includes at least one data terminal controller coupled to the host system and responsive to one or more coupled data terminals, for controlling access to the host system by the coupled data terminals. Each of the data terminals include at least one user definable function selector such as a Smart Button, TM (Trademark of Davox Corporation) operative for selecting at least one previously defined data processing function.

The data terminal controller includes a statistical data collector, responsive to the coupled data terminals and to at least one selected data terminal user definable function selector, for gathering statistical data concerning the data processing function selected by the user definable function selector, and operation of the data terminal.

The preferred embodiment includes a data terminal controller coupled to a number of data terminals. The data terminal controller, coupled to the number of data terminals, is coupled to one node or port of each host computer. In this embodiment, the statistical data collector collects data on the operation of the number of data terminals on a data terminal operator by operator basis and records the information as an event log file. Further, each of the data terminals may include a plurality of user definable functions selectors.

DESCRIPTION OF THE DRAWINGS

These, and other features and advantages of the present invention will be better understood by reading the following detailed description taken together with the drawings wherein:

FIG. 3 is an illustration of a statistical data report generated from the statistical data gathered and accumulated by the statistical data portion of the data terminal controller according to the present invention.

DETAILED DESCRIPTION OF THE INVENTION

Figure 1:
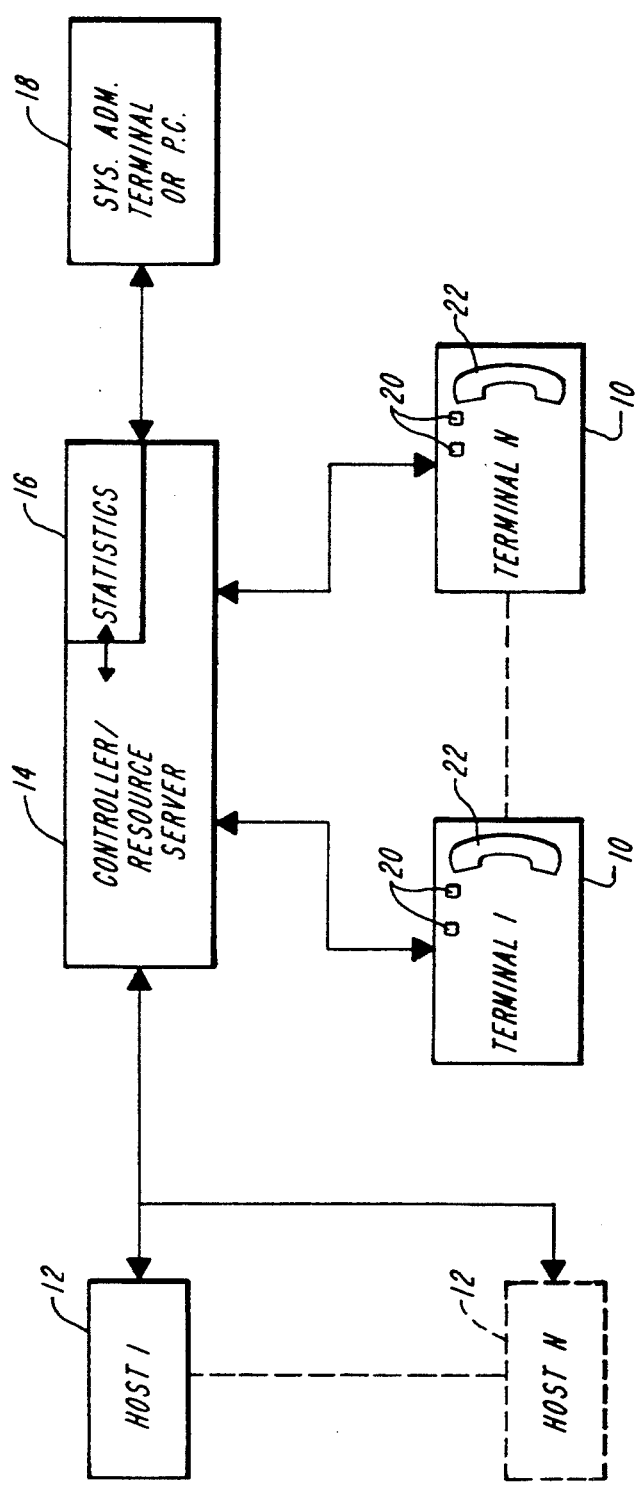
FIG. 1 is a block diagram of a system for collecting statistical data from a plurality of data terminals coupled to a data terminal controller according to the present invention.

An exemplary data processing system on which may be implemented the automated statistical data collection system of the present invention is illustrated in FIG. 1 and includes one or more data terminals 10 coupled to at least one host system 12 by means of a data terminal controller/resource server 14. For the purposes of describing the present invention, the term "data processing function" is used in its broadest sense and includes, but is not limited to, accessing a host computer; transaction processing; data collection, manipulation, printing, display and storage; customer account disposition; data communications; and telephone set usage.

Although data terminal controllers/resource servers are well known in the art, the preferred embodiment contemplates implementing the automated statistical data collecting system of the present invention on a resource server such as the Communications Resource Server (CRS) available from Davox Corporation, Billerica, Mass.

The controller/resource server 14 includes a statistical data collector 16 which in this embodiment is an event log file as will be explained more fully below. The statistical data collector 16 monitors the activities of terminal 10 through the controller/resource server 14. The statistical data collector 16 also communicates with the system administrator's terminal 18 through the controller/resource server 14. In the preferred embodiment, the system administrator terminal includes a personal computer capable of supporting the operation of a database program such as dbase IV a data base program, or any similar statistical analysis and reporting programs.

In the preferred embodiment, statistical data collector 16 is responsive to one or more user definable and programmable data terminal selectors such as programmable keys or Smart Buttons TM and telephone set 22. A user definable or programmable data terminal selector allows the user to define one or more of functionalities or task to be selected and executed upon the activation of an associated keyboard key, telephone hand-set or other similar selector device.

For example, picking-up or hanging-up of the telephone handset 22 may initiate one or more such user definable or programmable functions. Such functionality or task, also referred to as a workstation programmable function, includes but is not limited to such functions as transmitting data to a host computer, notifying a supervisor of operator availability, automatically preparing a letter or other form, and initiating a user defined mathematical function.

Such workstation programmable functions are also described in co-pending U.S. patent application Nos. 07/532,453 and 07/798,239, commonly owned by the assignee of the present invention and incorporated herein by reference. An example of a data terminal which supports user defining or programming of various selector devices includes the DAVOX 5900 workstation which integrates a video terminal, programmable keyboard and telephone handset into one unit.

Figure 2:
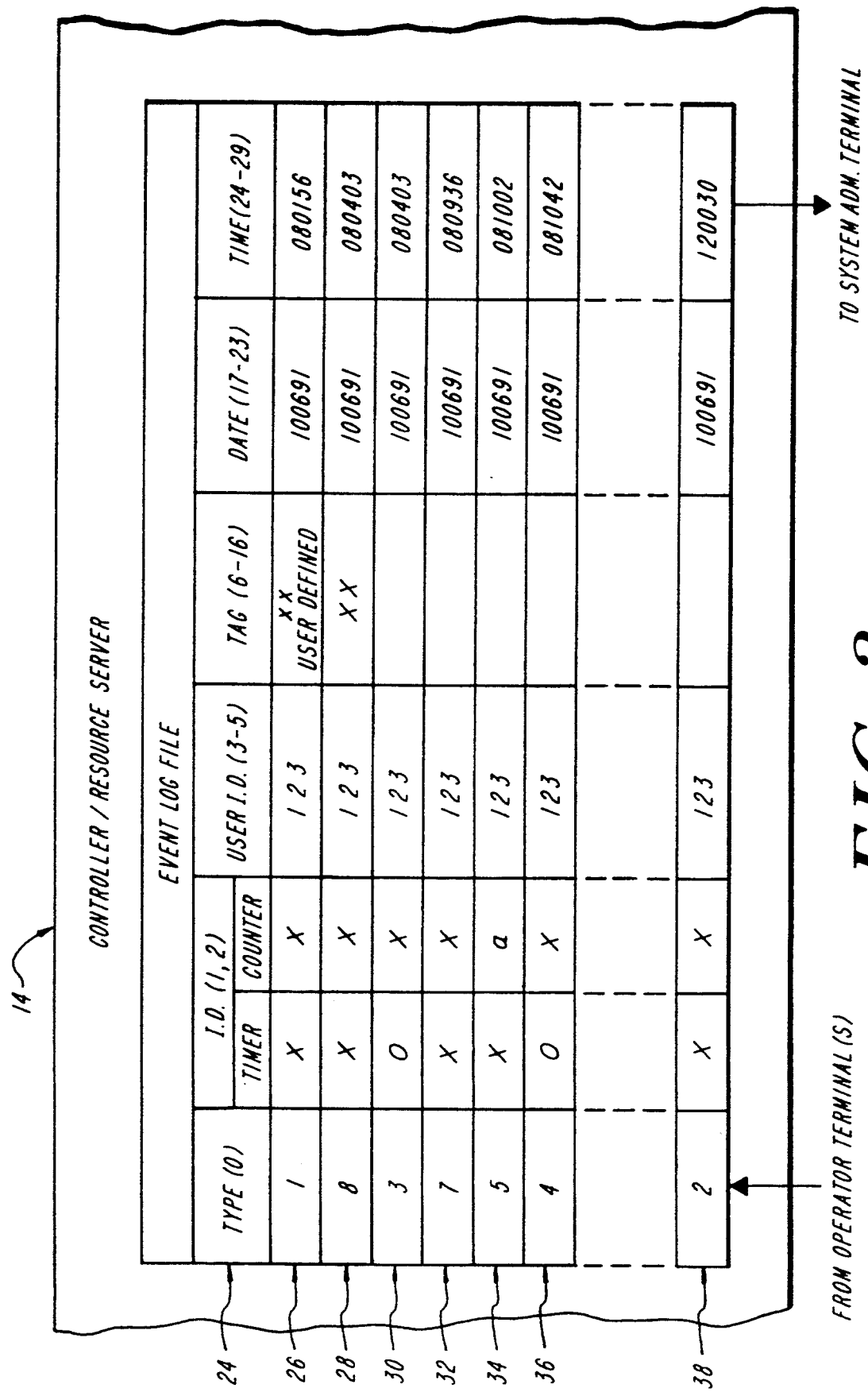
FIG. 2 is a table representing the event log file of the statistical data collection system according to the present invention.

A more detailed representation of the statistical data collection system of the present invention is illustrated in FIG. 2 wherein is shown statistical data collector 16 implemented as an event log file which is stored in the controller/resource server.

The statistical data collection system of the present invention as implemented in this example by an event log file monitors "events" generated by any and all coupled operator terminals. The statistical data collection system validates event data, time stamps the events, and saves the data in the form of an event log file.

Each entry in the event log file is a fixed length of, for example, 30 bytes. The definition of the bytes which comprise each entry in the event log file is shown generally at 24 and includes an event type code (byte 0); an event ID code (bytes 1, 2); a user ID code (bytes 3–5); an event tag code (bytes 6–16); a date code (bytes 17–23); and a time code (bytes 24–29).

As shown in Table 1 below, event types may include any and all activities which the system administrator may wish to track such as user log on and log off, phone on or off hook conditions, system boot or reboot, and time or count related events.

TABLE I

Event Type: 
1 = user logon
2 = user logoff
3 = timer on
4 = timer off
5 = counter increment
6 = system boot
7 = phone on-hook TABLE I-continued 8 = phone off-hook In the present embodiment, the two byte event ID is comprised of a first byte representing a "timer event" and which identifies one of ten timers numbered 0 through 9. The second byte of the event ID is associated with a counter event, representing one of 52 counters labeled a through z, and A through Z. The user ID is a three byte identification code which the statistical data collection system of the present invention retrieves from a lookup table identifying system operators or users.

Each entry in the event log file further includes an associated date and time stamp. Finally, a tag field comprised of for example, bytes 6–16 are user definable and may be associated with event types and thus, are not necessary for a thorough explanation and understanding of the present invention.

The following example will be used to illustrate both the programming of a user definable keyboard selector which generates an entry into the statistical data collector of the present invention, as well as a preferred embodiment of the entry itself.

For example, a user may define a predetermined key also called a Smart Button TM on the data terminal to automatically perform the function of accessing a host computer, opening a predetermined file according to data displayed on the data terminal screen, and retrieving a record based on the data displayed on the data terminal screen. In such cases, the system administrator may desire to monitor the number of times a particular host and file are accessed. Accordingly, the commands which the user generates to define a desired function or task to be performed when selected by the predetermined key or Smart Button TM to execute such a desired function includes a command similar to the following: INC Cntr A, for "increment counter A". Thus, by subsequently totalling the number of Increment Counter A commands, or reading the contents of Counter A, the statistical data collector system will be able to determine the number of times the associated task was performed. It should be noted that any one of the counters may be utilized.

When the user defined function key is depressed or otherwise selected as established by the user, execution of the function includes an event which is logged in the event log file of the statistical data collector of the present invention.

An example of several operator generated events will now be used to better explain the entries in the event log file which is one embodiment of the present statistical data collector. For example, as shown generally at line 26, the first entry in an event log file might include a user logon event, type "1". With the event type is logged the 3 byte user identification code, the date code (month, date, year), and a time code (hour, minute, seconds). Codes marked "XX" are "don't care" or user defined access only fields.

After an operator has logged on, the next example of an event a system administrator may wish to log is an operator picking up a telephone hand set that is, taking a telephone off-hook. This is illustrated by event type code 8, line 28 of the event log file. This event log file entry also includes an associated user ID, date and time stamp. Although events for only one user ID are shown, it is understood that the system will record events for all users in one event log file, as the events occur. Thus, for the sake of clarity, only events of one user are illustrated.

It should be further noted that the types of events which the statistical data collection system of the present invention logs in the event log file is completely user definable based upon whether a command which generates such reportable events is included in the definition of the user definable programmable function.

In the design of the user's overall statistical data collection and analysis needs, a system administrator may wish to separately keep track of the amount of time an operator spends on the telephone as well as time an operator spends "wrapping up" or completing a call after hanging up with a customer. In such situations, removing the telephone hand set from the receiver may log not only the event previously described on line 28 of the event log file, but may also generate the event at line 30 which will simultaneously turn on timer 0 as noted by event type 3 and event ID 0X.

After the operator completes the call, returning the telephone set to the receiver will automatically generate a "phone on-hook" event (7), which is logged at line 32 in the event log file. During the "wrap up" or post customer connect period, the operator may perform such activities as printing form letters based on discussions with the customer to confirm payment terms or complete other tasks discussed.

The system administrator may also wish to compile statistics about such tasks and accordingly, may program or predefine an operator terminal key to automatically print such a letter. Accompanying the command sequence assigned to a selected key to accomplish such a function, the system administrator will add the appropriate code to increment a counter. Such a counter is used to accumulate and indicate the number of times such a task is performed. Such events are also logged in the event log file as illustrated at line 34 wherein counter "a" is incremented. Although the specific time and/or date of such an event may not be essential to the system administrator, such information is automatically logged upon the occurrence of each selected event.

Finally, the operator will complete the handling of a particular matter which may include updating the client's file on one or more data bases located on one or more host computers. Such a task will also be predefined and performed by the operator by the mere depressing of a single key. The command sequence which the system administrator will utilize to define such a function will also include the command to stop or turn off a given timer and which will be recorded in the event log file. This enables the system administrator to track the total amount of time an operator spent handling each call and finally, enable the administrator to determine statistics or averages for that operator. Thus, line 36 of the event log file includes an event which turns off timer 0 previously turned on at line 30. Eventually, a user logoff entry (2) line 38 will be recorded in the event log file for user 123.

When the system manager or administrator initiates statistical report generation, a preprocessing program resident in the system administrator's terminal or personal computer in the preferred embodiment, or in the controller/resource server, will search the statistical data collector event log file for pairs of similar entries or for independent entries, and will tally or count those entries.

For example, all occurrences of event types "Increment Counter", event code 5, event ID x,a will be added. This will result in the total number of times that counter A was incremented indicating, in this example, the number of times a predetermined form was printed on a user by user basis. Other identical entries for each are similarly tallied. In addition, the time stamp associated with each event entry may be utilized by the preprocessing program, at the request of the system manager or administrator, to further define the event in terms of time, such as during what hours of the day most forms are printed, a host or file is most frequently accessed, or other similar statistical information.

When the system manager or administrator initiates statistical report generation, the preprocessing program resident in either the system administrator's personal computer/terminal or controller/resource server 14 will search the event file for pairs of start and stop times of the same timer or of the same event type such as log on and log off, and subtract the time stamp values to determine elapsed time. Thus, a report generator may easily determine the elapsed time of a predetermined event such as the amount of time an operator has spent on the telephone, on wrapping up, or logged on to the system.

An example of a report generated from the statistical data collected by the statistical data collector of the present invention is shown in FIG. 3 wherein has been generated an hourly operator productivity report which breaks down, on an hourly basis, the total number of accounts worked by the operator by account type, including the amount of time the operator spent on the telephone and the amount of time spent wrapping up the account. In addition, information on average times may also provided. Other similar reports may be easily designed and generated by the system manager utilizing a data base program.

Modifications and substitutions by one of ordinary skilled in the art are considered to be within the scope of the present invention which is not to be limited except by the claims which follow.

We claim:

1. A system for gathering, processing and displaying statistical data concerning the operation of at least one data terminal coupled to at least one host system by means of a data terminal controller, comprising:

a data terminal controller, coupled to one port of said at least one host system and to said at least one data terminal, and responsive to said at least one data terminal, for controlling access to said at least one host system by said at least one data terminal;

said at least one data terminal including at least one user definable function selector, said at least one user definable function selector operative for selecting and initiating the execution of at least one previously defined data processing function; and said data terminal controller including a statistical data collector, responsive to said at least one data terminal and to at least one selected data terminal user definable function selector which has initiated the execution of at least one previously defined data processing function, for gathering statistical data concerning said data processing function selected and initiated by said user definable function selector and operation of said data terminal as said statistical data is generated and as operation of said data terminal is taking place, for processing at least said gathered statistical data as said statistical data is generated, and for displaying said processed statistical data as said statistical data is processed.

2. The system of claim 1 further including a plurality of data terminals, each of said plurality of data terminals coupled to said data terminal controller.

3. The system of claim 2 wherein said data terminal controller includes a data terminal server, coupled to said one port of said at least one host system.

4. The system of claim 3 wherein said statistical data collector collects data on the operation of said plurality of data terminals on a data terminal operator by operator basis.

5. The system of claim 2 wherein each of said plurality of data terminals include a plurality of user definable function selectors.

6. The system of claim 1 wherein said previously defined data processing functions are selected from the group consisting of accessing a host computer, signing-off a host computer, a telephone on-hook condition, a telephone off-hook condition, accessing a data base, writing to a data base, logging on a data terminal by an operator and logging off a data terminal by an operator.

7. The system of claim 1 wherein said statistical data includes event detection.

8. The system of claim 7 wherein said event detection includes detection of the execution of said at least one previously defined data processing function.

9. The system of claim 1 wherein said statistical data includes the elapsed time of the occurrence of at least one previously defined data processing function.

10. The system of claim 1 wherein said statistical data collector means includes at least an event recorder and an event timer.

11. The system of claim 10 wherein selection and execution of each of said at least one previously defined data processing functions generates at least one event; and wherein said at least one event recorder is responsive to said at least one generated event for recording the occurrence of said generated event.

12. The system of claim 11 wherein said event recorder records each generated event along with an associated time stamp.

13. The system of claim 12 wherein said associated time stamp is provided by said statistical data collector event timer.

14. A system for gathering, processing and displaying statistical data concerning the operation of a plurality of data terminals coupled to at least one host system and a data terminal server, comprising:

a data terminal server, coupled to one port of said at least one host system, and responsive to said plurality of coupled data terminals, for controlling access to said at least one host system by said plurality of data terminals;

each of said plurality of data terminals coupled to said data terminal server and operated by a corresponding plurality of data terminal operators, each of said data terminals including at least one user definable function selector, said at least one user definable function selector operative for selecting and initiating execution of at least one previously defined data processing function, and for generating at least one event upon said execution, and said data terminal server including at least one event recorder and at least one event timer, and responsive to said plurality of coupled data terminals and to the generation of said at least one event, for recording said at least one event generated by the execution of said at least one previously defined data processing function selected by said at least one user definable function selector of said data terminals as said events occur, said recorded events including indicia of the data terminal operator operating the data terminal which generated said events, said data terminal event timer generating a time indicia associated and recorded with each of said generated events, as said generated events occur, and for processing said gathered statistical data as said statistical data is generated, and for displaying said processed statistical data as said statistical data is processed.

15. A system for gathering statistical data concerning the operation of a plurality of data terminals coupled to a plurality of host systems and a data terminal server, comprising:

at least one data terminal server, coupled to one port of each of said plurality of host systems, and responsive to said plurality of coupled data terminals, for controlling access to said plurality of host systems by said plurality of data terminals, each of said plurality of data terminals coupled to said data terminal server and operated by a corresponding plurality of data terminal operators, each of said data terminals including at least one user definable function selector, said at least one user definable function selector operative for selecting and initiating execution of at least one previously defined data processing function, and for generating at least one event upon said execution; and said data terminal server including at least one event recorder and at least one event timer, and responsive to said plurality of coupled data terminals and to the generation of said at least one event, for recording said at least one event generated by the execution of said at least one previously defined data processing function selected by said at least one user definable function selector of said data terminals as said generated events occur, said recorded events including indicia of the data terminal operator operating the data terminal which generated said events, said data terminal event timer generating a time indicia associated and recorded with each of said generated events as said generated events, occur, and for processing said gathered statistical data as said statistical data is generated, and for displaying said processed statistical data as said statistical data is gathered.

* * * * *